United States Patent
Seadat Beheshti et al.

(10) Patent No.: US 12,124,043 B2
(45) Date of Patent: Oct. 22, 2024

(54) ELECTRONIC DEVICES WITH DROP PROTECTION

(71) Applicant: Apple Inc., Cupertino, CA (US)

(72) Inventors: Matin Seadat Beheshti, Sunnyvale, CA (US); Aidan N Zimmerman, Poway, CA (US); John S Camp, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/352,967

(22) Filed: Jul. 14, 2023

(65) Prior Publication Data
US 2024/0094549 A1    Mar. 21, 2024

Related U.S. Application Data

(60) Provisional application No. 63/406,943, filed on Sep. 15, 2022.

(51) Int. Cl.
*G02B 27/01*    (2006.01)
(52) U.S. Cl.
CPC .. *G02B 27/0176* (2013.01); *G02B 2027/0154* (2013.01); *G02B 2027/0163* (2013.01)
(58) Field of Classification Search
CPC .............. G02B 27/017; G02B 27/0176; G02B 2027/0154; G02B 2027/0163
See application file for complete search history.

(56) References Cited

U.S. PATENT DOCUMENTS

| | | |
|---|---|---|
| 8,305,744 B2 | 11/2012 | Shedletsky et al. |
| 8,903,519 B2 | 12/2014 | King et al. |
| 9,342,108 B2 | 5/2016 | Rothkopf et al. |
| 9,505,032 B2 | 11/2016 | Ely et al. |
| 9,706,028 B1 | 7/2017 | Hart et al. |
| 10,405,440 B2 | 9/2019 | Burdoucci |
| 2013/0112104 A1* | 5/2013 | Tamai .................. F16H 25/24 74/89.34 |
| 2020/0355919 A1* | 11/2020 | Tao .................. G02B 27/0172 |

* cited by examiner

*Primary Examiner* — Nitin Patel
*Assistant Examiner* — Cory A Almeida
(74) *Attorney, Agent, or Firm* — Treyz Law Group, P.C.; G. Victor Treyz; Kendall P. Woodruff

(57) ABSTRACT

A head-mounted device may include optical assemblies for presenting images to a user. Actuators may be used to adjust the spacing between the optical assemblies to accommodate different interpupillary distances. Upon detection of a power-down event or drop event, the device may be placed into an impact-safe mode. During the safe mode, the optical assemblies may be moved to predetermined impact-safe positions, brakes such as optical guide rail brakes may be adjusted, cushioning springs may be deployed, clutches may be adjusted, and/or other safety mechanisms may be activated to help protect the optical assemblies or other sensitive components from damage.

20 Claims, 6 Drawing Sheets

ELECTRONIC DEVICES WITH DROP PROTECTION

This application claims the benefit of provisional patent application No. 63/406,943, filed Sep. 15, 2022, which is hereby incorporated by reference herein in its entirety.

FIELD

This relates generally to electronic devices, and, more particularly, to electronic devices such as head-mounted devices.

BACKGROUND

Electronic devices have components such as displays and other optical components. There is a risk of damage to these components due to drop events and other undesired high-stress events.

SUMMARY

An electronic device such as a head-mounted device may include optical assemblies for presenting images to a user. Each optical assembly may include a display and lens mounted in a support. Actuators may be used to adjust the spacing between the optical assemblies to accommodate different interpupillary distances.

When appropriate conditions are detected such as upon power-down or upon detection of a drop event using a sensor such as an accelerometer, the device may be placed into a safe mode. During the safe mode, the optical assemblies may be moved to predetermined impact-safe positions, brakes such as optical assembly guide rail brakes may be adjusted, cushioning springs may be deployed, clutches may be adjusted, and/or other safety mechanisms may be activated to help protect the optical assemblies and other drop-sensitive components from damage.

DETAILED DESCRIPTION

Figure 1:
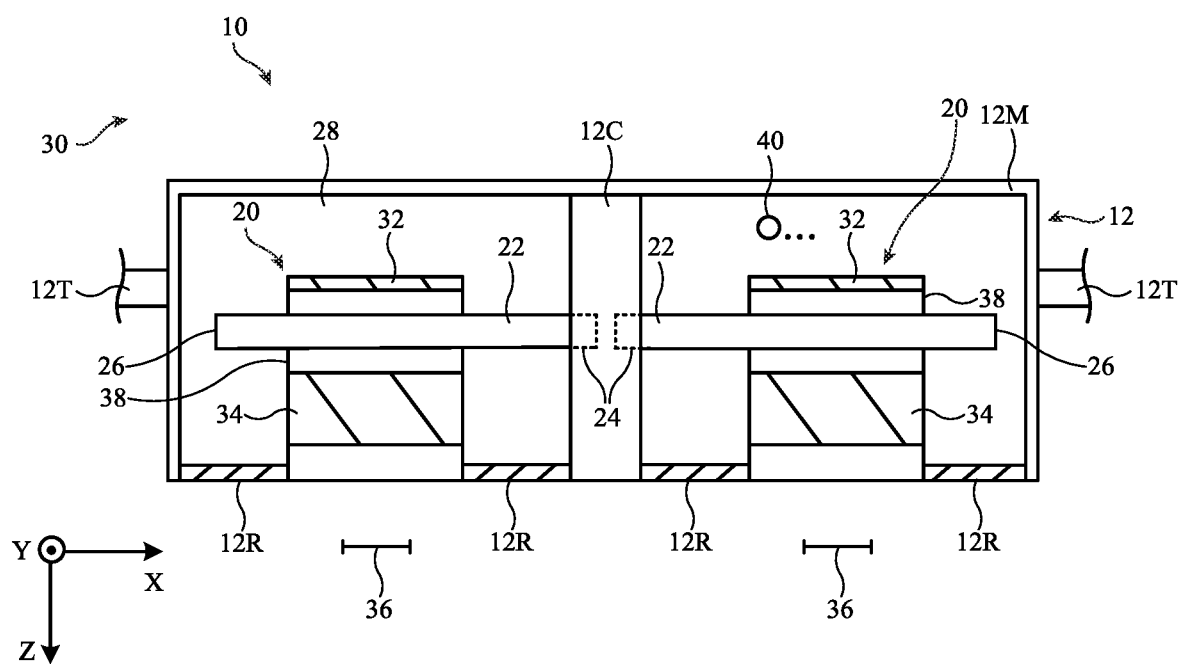
FIG. 1 is a diagram of an illustrative head-mounted device in accordance with an embodiment.

FIG. 1 is a schematic diagram of an illustrative electronic device of the type that may include drop protection capabilities. Device 10 of FIG. 1 may be a head-mounted device (e.g., goggles, glasses, a helmet, and/or other head-mounted device), a cellular telephone, a tablet computer, a laptop computer, a wristwatch, a peripheral device (sometimes referred to as a peripheral) such as a pair of headphones, or other electronic equipment. In an illustrative configuration, device 10 is a head-mounted device such as a pair of goggles (sometimes referred to as virtual reality goggles, mixed reality goggles, augmented reality glasses, etc.).

As shown in the illustrative top view of device 10 of FIG. 1, device 10 may have a housing such as housing 12 (sometimes referred to as a head-mounted support structure or head-mounted support). Housing 12 may include a main portion such as portion 12M (sometimes referred to as a main unit or head-mounted unit) and other head-mounted support structures such as head strap 12T. When housing 12 is being worn on the head of a user, the front of housing 12 may face outwardly away from the user, the rear of housing 12 may face towards the user, and the user's eyes may be located in eye boxes 36.

Device 10 may have electrical and optical components that are used in displaying images to eye boxes 36 when device 10 is being worn. These components may include left and right optical assemblies 20 (sometimes referred to as optical modules). Each optical assembly 20 may have an optical assembly support 38 (sometimes referred to as a lens barrel or optical module support) and guide rails 22 along which optical assemblies 20 may slide to adjust optical-assembly-to-optical-assembly separation to accommodate different user interpupillary distances.

Each assembly 20 may have a display 32 that has an array of pixels for displaying images and a lens 34. Display 32 and lens 34 of each assembly 20 may be coupled to and supported by support 38. During operation, images displayed by displays 32 may be presented to eye boxes 36 through lenses 34 for viewing by the user.

Housing 12 may have a flexible curtain (sometimes referred to as a flexible rear housing wall or fabric housing wall) such as curtain 12R on the rear of device 10 facing eye boxes 36. Curtain 12R has openings that receive assemblies 20. The edges of curtain 12R that surround each support 38 may be coupled to that support 38. The outer peripheral edge of curtain 12R may be attached to rigid housing walls forming an outer shell portion of main housing 12M.

The walls of housing 12 may separate interior region 28 within device 10 from exterior region 30 surrounding device 10.

Inner ends 24 of guide rails 22 may be attached to central housing portion 12C. Opposing outer ends 26 may, in an illustrative configuration, be unsupported (e.g., the outer end portions of rails 22 may not directly contact housing 12, so that these ends float in interior region 28 with respect to housing 12).

Device 10 may include control circuitry and other components such as component 40. The control circuitry may include storage, processing circuitry formed from one or more microprocessors and/or other circuits. To support communications between device 10 and external equipment, the control circuitry may include wireless communications circuitry. Components 40 may include sensors such as such as force sensors (e.g., strain gauges, capacitive force sensors, resistive force sensors, etc.), audio sensors such as microphones, touch and/or proximity sensors such as capacitive sensors, optical sensors such as optical sensors that emit and detect light, ultrasonic sensors, and/or other touch sensors and/or proximity sensors, monochromatic and color ambient light sensors, image sensors, sensors for detecting position, orientation, and/or motion (e.g., accelerometers, magnetic sensors such as compass sensors, gyroscopes, and/or sensors such as inertial measurement units that contain some or all of these sensors), radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, visual inertial odometry sensors, and/or other sensors. In some arrangements, devices 10 may use sensors to gather user input (e.g., button press input, touch input, etc.). Sensors may also be used in gathering environmental motion (e.g., device motion measurements, temperature measurements, ambient light readings, etc.).

Sensors in components 40 such as position sensors may be mounted to housing 12 and/or other portions of device 10. Position sensors may include accelerometers, magnetic sensors such as compass sensors, gyroscopes, and/or inertial measurement units that contain some or all of these sensors. These sensors may be used to measure location (e.g., location along X, Y, and Z axes), orientation (e.g., angular orientation around the X, Y, and Z axes), and/or motion (changes in location and/or orientation as a function of time). Sensors such as accelerometers and/or inertial measurement units (and/or other sensors such as visual inertial odometry sensors) that can measure location, orientation, and/or motion may sometimes be referred to herein as position sensors, motion sensors, and/or orientation sensors.

During operation, device 10 may use a position sensor to monitor the position (e.g., location, orientation, motion, etc.) of device 10 in real time. This information may be used in controlling electrically controlled actuators (motors, solenoids, piezoelectric actuators, and/or other actuators) to help protect device 10 in the event of a high-stress event such as an impact during a drop. For example, one or more actuators may be used to place device 10 into an impact-safe (drop-resistant) state when a fall is detected by a position senor. Device 10 may also be placed into a safe mode upon the occurrence of other conditions. As an example, device 10 may be placed into an impact-safe state each time device 10 is powered down (fully or at least partially by placing device 10 in a low-power sleep mode).

Figure 2:
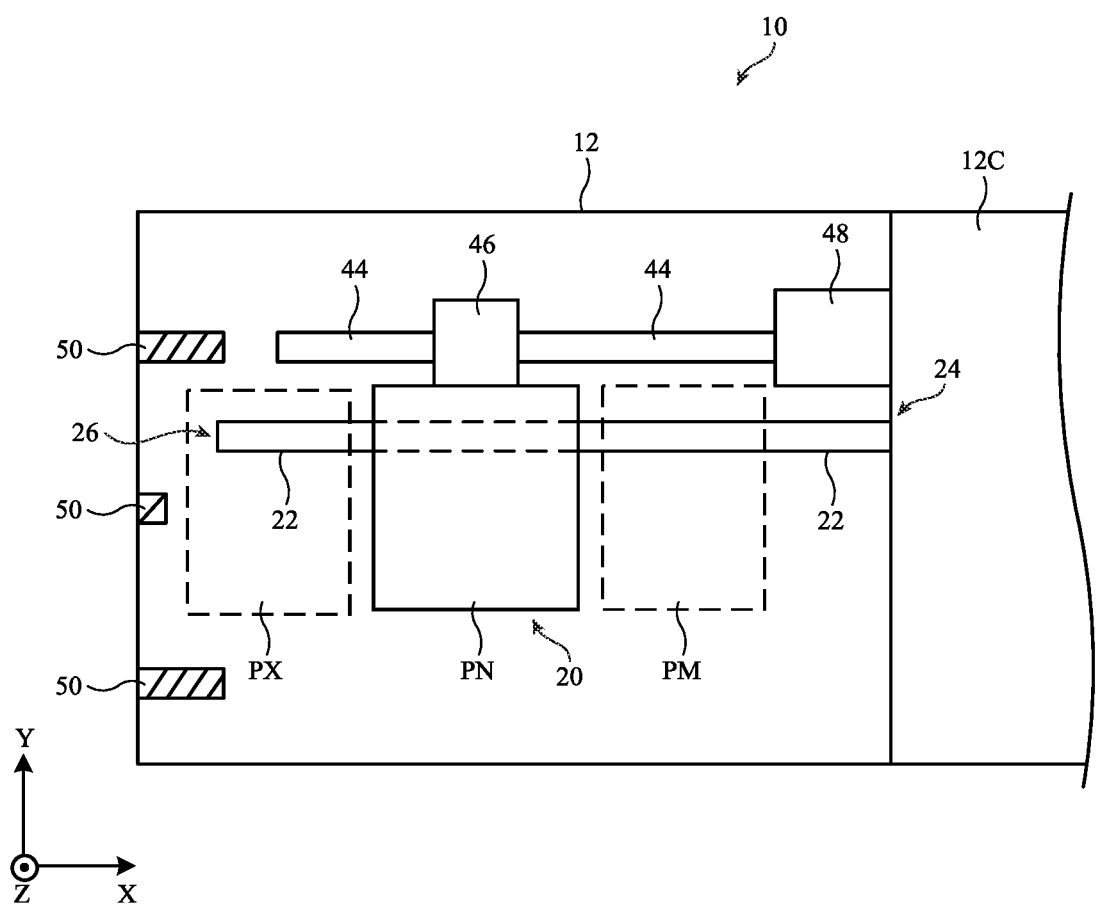
FIGS. 2 and 3 are rear views of portions of illustrative head-mounted devices in accordance with embodiments.

FIG. 2 is a rear view of an illustrative portion of device 10 (e.g., an inside left portion in this example). Device 10 may have left and right actuators (e.g., motors) such as actuator 48 that are used to rotate an elongated threaded shaft such as screw 44. Nut 46 has threads that engage the threads on screw 44. As motor 48 is turned, nut 46 is driven in the +X or −X direction (in accordance with whether screw 44 is being rotated clockwise or counterclockwise). In turn, this moves optical assembly 20 in the +X or −X direction along optical assembly guide rail 22. Assembly 20 (e.g., support 38 of FIG. 1) may have portions that receive rail 22 and that guide assembly 20 along rail 22. By controlling the activity of motors 48, the spacing between the left and right optical assemblies of device 10 can be adjusted to accommodate the interpupillary distance of different users. For example, if a user has closely spaced eyes, assemblies 20 may be moved inwardly (towards each other) and if a user has widely spaced eyes, assemblies 20 may be moved outwardly (away from each other).

In the event of a drop, stress is imposed on device 10 that can cause device components to move relative to housing 12 and relative to other components. To help prevent damage to components and device 10, device 10 can be placed in a safe state prior to impact. As an example, assemblies 20 may be moved along guide rails 22 to positions (sometimes referred to as safe positions or impact-safe positions) that are less likely to result in undesired damage than other positions. Assemblies 20 may be moved (and/or other suitable actions may be taken to place device 10 into a safe operating mode) in response to detection of a drop event (e.g., to detection with a position sensor that device 10 is weightless and therefore in free fall), in response to detecting that device 10 is being powered down (e.g., so that device 10 is in its safe state while powered off), and/or in response to detecting other suitable safe-mode conditions.

Consider, as an example, an arrangement in which optical assemblies 20 are sensitive to damage (and may be costly and/or difficult to repair). In this type of scenario, it may be desirable to protect optical assemblies 20 from damage during drop events by moving optical assemblies 20 along rails 22 to impact-safe positions upon occurrence of a safe-mode condition.

In a first scenario (e.g., a scenario in which rails 22 have a relatively low stiffness) assemblies 20 may be moved (parked) at outer ends 26, as indicated by illustrative outer position PX of FIG. 2. By moving assemblies 20 to their outermost (or nearly outermost) positions at ends 26, rails 22 may be caused to bend (flex) more than other positions, due to the location of the mass of assemblies 20 at the outer tips of rails 22). Bumpers 50 that are mounted to housing 12 may be used to constrain the deflection of rails 22 to prevent undesired plastic deformation of rails 22 during drops or other events where housing 12 impacts an external object. Bumpers 50 may also constrain the movement of assemblies 20 to prevent collisions between assemblies 20 and other device components. Because rails 22 deform to their maximum permitted extent in this scenario, the flexing of rails 22 may help absorb impact energy and cushion the impact of assemblies 20 against bumpers 50, thereby helping to prevent any damage to assemblies 20.

In a second scenario, the interior of device 10 is small to help reduce the overall size of device 10. In this scenario, there may not be excess room available to allow assemblies 20 to sway on the ends of rails 22 during an impact. Accordingly, a satisfactory safe location for assemblies 20 may be at innermost (or nearly innermost) position PM, in which assemblies 20 are at inner ends 24. In this type of arrangement, rails 22 are preferably provided with sufficient sheer strength to sustain stress from assemblies 20 during a drop event.

In a third scenario, it is desired to protect assemblies 20 from damage when device 10 is dropped on its left or right side. In this type of drop event, assemblies 20 are exposed to force along the length of rails 22 (sometimes referred to as axial force). If, as an example, device 10 is dropped on its left side, the left assembly 20 will be forced towards the outer end 26 of the left guide rail 22 and the right assembly 20 will be force towards the inner end 24 of the right guide rail 22. To help prevent undesired hard impacts at the outer or inner ends of the guide rails, assemblies 20 may be moved to a safe central location along the length of rails 22, as illustrated by safe intermediate position PN in the example of FIG. 2. At these positions, optical assemblies 20 can slide along rails 22 somewhat to dissipate drop energy without reaching the ends of the rails.

As these examples demonstrate, there may be different types of satisfactory safe positions along guide rails 22 associated with different types of devices 10. For some devices, outer positions PX may serve as safe positions, for some devices inner positions PM may serve as safe positions, and for some devices intermediate positions PN may serve as safe positions. Device 10 (e.g., actuators 48) may place assemblies 20 in their safe positions upon detection of a safe-mode event (e.g., upon detecting a device free-fall event, upon detecting a device powering down event, etc.). The safe positions are generally not matched to the interpupillary distance of the user of device 10.

If desired, additional components may be adjusted to help protect sensitive device structures such as assemblies 20 from drop event damage. As examples, adjustable clutch mechanisms may be adjusted, adjustable brakes may be adjusted, and/or adjustable springs (cushions) may be adjusted to place device 10 in a safe mode upon detection of a safe mode condition. These adjustments may be made in addition to or instead of repositioning assemblies 20 along rails 22.

Figure 3:
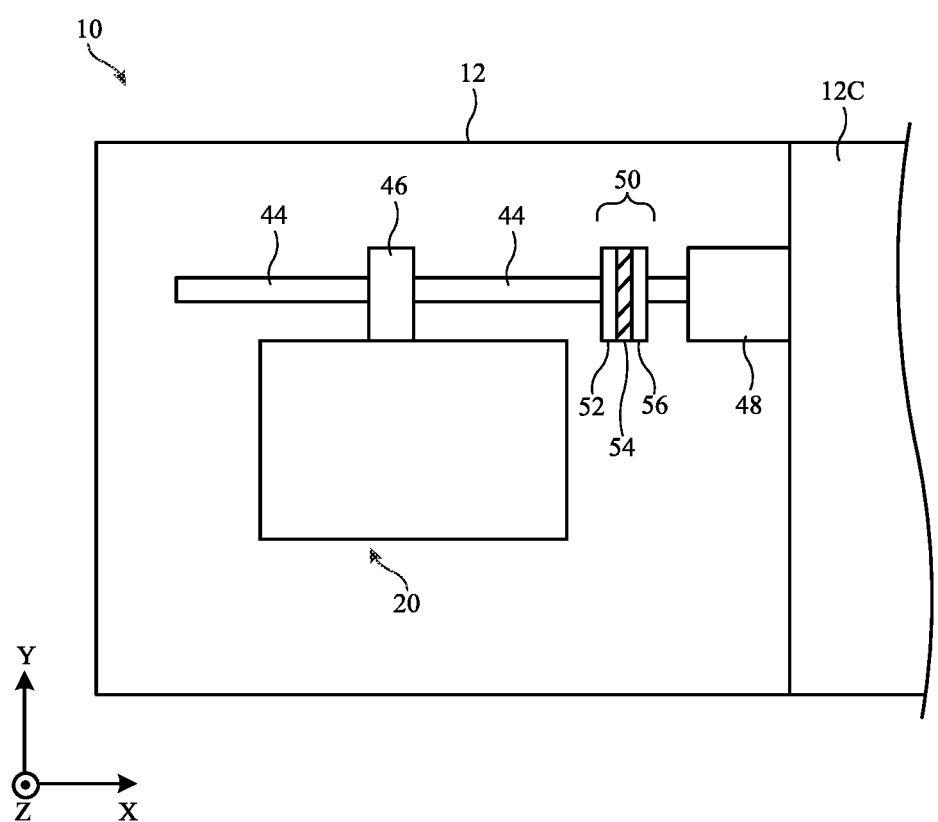

Consider, as an example, the arrangement of device 10 of FIG. 3. In the example of FIG. 3, assembly 20 is mounted to a guide rail 22 (not shown) for movement along the X axis, as described in connection with FIGS. 1 and 2. Nut 46 may have threads that engage the threads on screw 44. Motor 48 may rotate a shaft that is coupled to screw 44 using clutch 50. By selection of the direction of rotation of screw 44, the corresponding direction of movement of optical module 20 (which is coupled to nut 46) along the rail on which assembly 20 is traveling can be controlled. During a drop event such as a drop event imposing force in the +X or −X direction of FIG. 3, optical module 20 may be forced along the X axis. This imposes corresponding parallel motion to nut 46 along the length of screw 44, which may cause screw 44 to rotate about its rotation axis. As screw 44 is forced to rotate, torque may be applied to the shaft of motor 48 through clutch 50. When screw 44 is being rotated in this way, clutch 50 and/or motor 48 may exhibit friction that helps retard rotation of screw 44. This may help dampen sliding movement of nut 46 and assembly 20 along the X axis. If more than a threshold amount of torque is applied to clutch 50 due to the forced rotation of screw 44 during a drop event, there will be relative motion (slippage) within clutch 50. When clutch slippage occurs during drop events, motor 48 is relieved from being back driven (which may help prevent excessive gear loading). Clutch slippage also helps relieve screw 44 from being back driven so that forces at nut 46 are reduced.

Clutch 50 may have a first portion (e.g., a first plate) such as screw portion 52 attached to screw 44 and a second portion (e.g., a second plate) such as motor portion 56 that is attached to the shaft of motor 48. Clutch mechanism 54 may be a passive or active clutch mechanism that transfers torque between portion 52 and portion 56 of clutch. When motor 48 is active, clutch mechanism 54 causes screw portion 52 to rotate with motor portion 56, so that screw 44 may be rotated to adjust the position of assembly 20. When motor 48 is inactive (e.g., during a drop event), mechanism 54 may exhibit slippage that helps minimize torque applied to motor 48 and nut 46 (e.g., thread loads may be reduced).

In a first illustrative clutch arrangement, clutch 50 is a dry clutch and mechanism 54 is characterized by direct contact and friction between textured and/or untextured mating surfaces of portions 52 and 56. In this arrangement, portions 52 and 56 may be coupled without slipping by friction until more than a threshold amount of torque is applied to screw 44 due to axial motion of nut 46, at which point portion 52 may rotate faster than portion 56 while friction loosely couples portions 52 and 56. Clutch 50 may therefore help assembly 20 slide along its guide rail while supplying a dampening force to help prevent impact damage.

In a second illustrative clutch arrangement, clutch 50 is a hybrid clutch that is viscously coupled when clutch slippage occurs. In this type of arrangement, the hybrid clutch sticks (and portions 52 and 56 rotate in unison) below a threshold amount of torque. When more torque is applied, clutch 50 begins to slip. During slippage, oil or other viscous fluid in mechanism 54 viscously couples portions 52 and 56, allowing portions 52 and 56 to slip relative to each other while providing viscous damping. As with the dry clutch arrangement for clutch 50, the hybrid clutch mechanism may therefore rotate together until more than a threshold amount of torque is applied to screw 44.

In a third illustrative arrangement, portions 52 and 56 have first and second respective sets of magnets that are attracted to each other and thereby tend to hold the plates of portions 52 and 56 together. At lower amounts of applied torque to screw 44, the magnets may hold portions 52 and 56 together with sufficient authority to prevent portions 52 and 56 from slipping, whereas at higher torques, the magnets may break free of each other, allowing portions 52 and 56 to rotate relative to each other. When portions 52 and 56 rotate relative to each other, a damping effect may be created as the magnetic flux from the rotating magnets induces eddy currents in conductive material in portions 52 and 56 and/or a damping effect may be created due to friction between the rotating plates of portions 42 and 56.

In a fourth illustrative arrangement, mechanism 56 includes an electrically adjustable component such as a piezoelectric actuator or other actuator that can be controlled to adjust coupling torque between portions 52 and 56. If desired, this mechanism may be used in addition to other clutch structures (e.g., friction coupling structures, viscous fluid coupling structures, magnetic coupling structures, etc.). In one mode of operation, mechanism 56 may be used to enhance coupling between portions 52 and 56 (e.g., by pulling portions 52 and 56 together to help hold portions 52 and 56 together and/or by allowing a spring to pull portions 52 and 56 together). In this mode of operation, torque from screw 44 may be received by the shaft of motor 48 and dissipated by rotation of this shaft within motor 48 (as an example). In another mode of operation, mechanism 56 may be used to reduce coupling between portions 52 and 56 (e.g., by pushing portions 52 and 56 away from each other or otherwise decoupling portions 52 and 56). In this mode, rotation of screw 44 may be less damped, allowing assembly 20 to slide with less resistance. The electrically adjusted clutch mechanism may be used to increase or decrease the resistance to sliding of assembly 20 in a way that helps reduce damage during a drop. For example, to preserve the threads of nut 46 during a drop, clutch 50 may be disengaged (coupling may be reduced) so that portion 52 can rotate with reduced resistance. As another example, clutch 50 may be engaged (coupling may be increased) to help slow the motion of assembly 20 along the guide rails.

Figure 4:
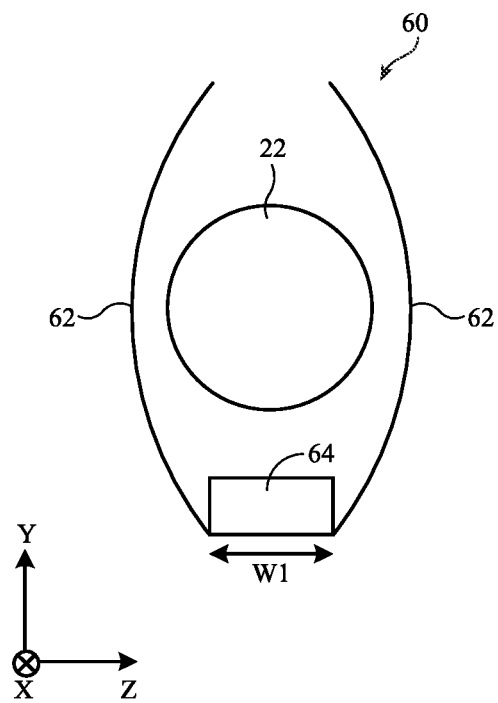
FIGS. 4 and 5 are cross-sectional side views of an illustrative brake in a head-mounted device in accordance with an embodiment.
Figure 5:
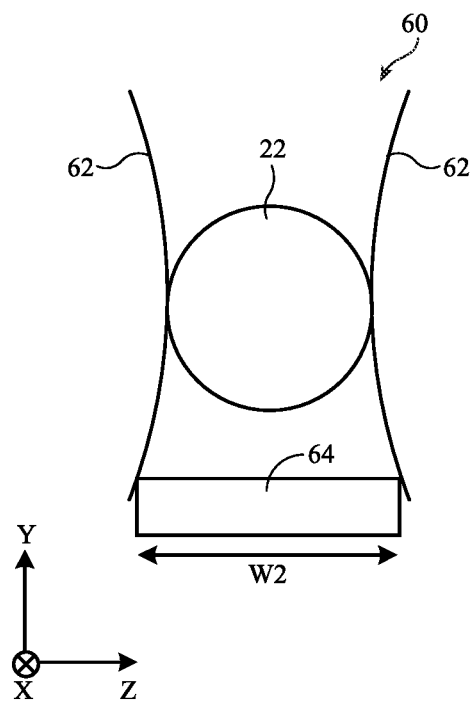

FIGS. 4 and 5 show how an adjustable guide rail brake mechanism may be used in device 10. The brake mechanism (which may sometimes be referred to as an optical assembly brake or component brake) may be used by each assembly 20 to help hold that assembly in place at a desired location along its guide rail when device 10 is placed into its safe mode of operation or at least to increase resistance to sliding along the guide rail.

FIG. 4 is a cross-sectional end view of an illustrative brake taken along the length of a guide rail. As shown in FIG. 4, brake 60 may have first and second bistable brake pads 62 and an electrically adjustable actuator such as actuator 64. In the configuration of FIG. 4, actuator 64 has been adjusted to exhibit a first width W1. In this state, brake pads 62 are bowed outwardly, which creates clearance between pads 62 and guide rail 22. Brake 60 may be attached to assembly 20, so the clearance between pads 62 and guide rail 22 that is shown in FIG. 4 allows assembly 20 to slide freely along the length of guide rail 22 without being held in place by brake 60. When it is desired to use brake 60 to help hold assembly 20 in place at a particular position along the length of guide rail 22 or at least to increase sliding resistance, actuator 64 may be expanded to a second width W2 that is greater than width W1, as shown in FIG. 5. This presses the lower portions of pads 62 apart from each other. As the bistable state of pads 62 is overcome, pads 62 will snap into the configuration of FIG. 5 in which pads 62 bow inwardly towards rail 22 and thereby apply pressure to rail 22. This creates friction between brake pads 62 and rail 22 that maintains brake 60 in place on rail 22 (and which therefore also helps assembly 20 in place on rail 22). The state of brake 60 may be adjusted when it is desired to switch device 10 between its normal operating mode and its safe mode. As one example, brake 60 may be placed in the unlocked state of FIG. 4 during normal operation so that the position of assembly 20 along rail 22 may be adjusted and may be placed in the deployed (locked) state of FIG. 5 during safe mode operations so that a desired safe position of assembly 20 along rail 22 may be maintained during a drop or so that friction is created that helps slow motion of assembly 20 along rail 22 during a drop.

Figure 6:
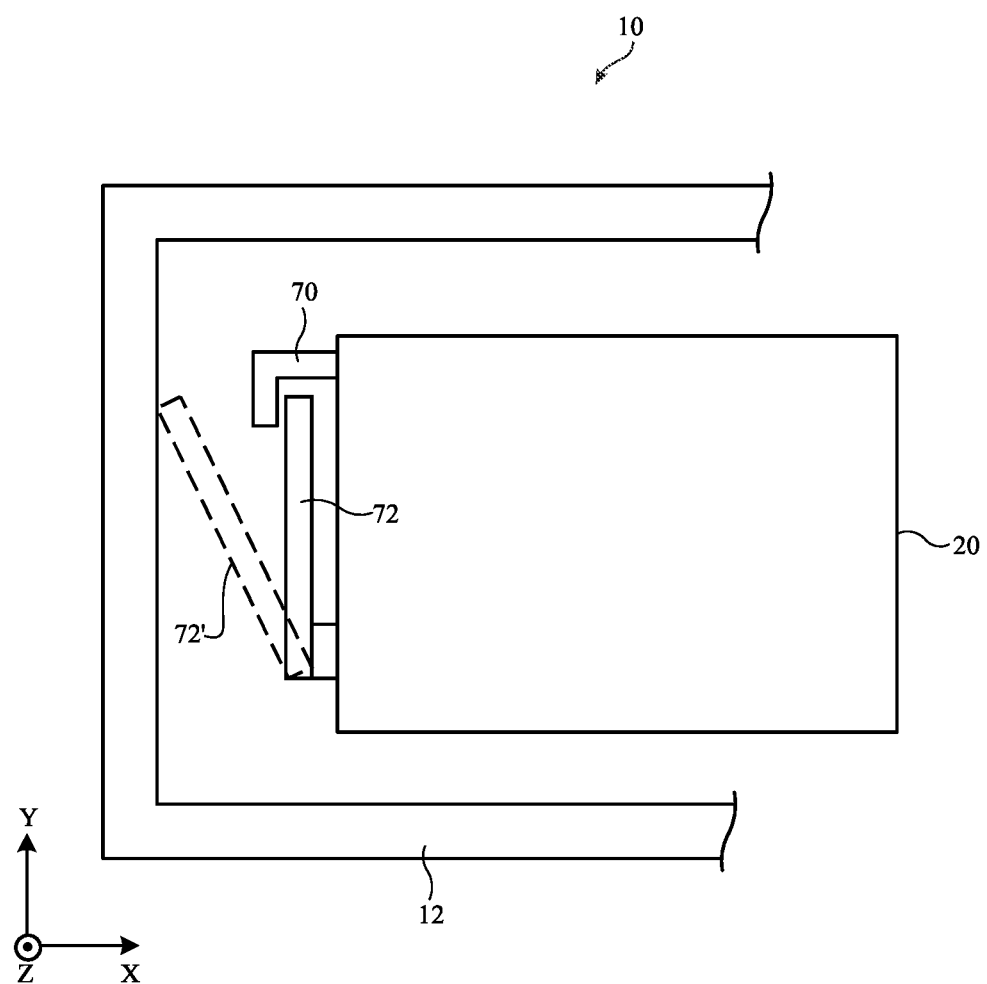
FIG. 6 is a rear view of an illustrative deployable spring for a head-mounted device in accordance with an embodiment.

If desired, device 10 may be provided with an adjustable spring (cushion). As shown in FIG. 6, for example, optical assembly 20 may have a deployable spring such as spring 72. During normal operation, spring 72 may be compressed (e.g., by moving assembly 20 outwardly towards the wall of housing 12 so that spring 72 is pressed against the surface of assembly 20). Once spring 72 is compressed in this way, electrically adjustable latch 70 (e.g., a piezoelectric latch or electromagnetic latch) may be used to capture and temporarily contain spring 72 (as shown in the illustrative compressed-spring arrangement of FIG. 6). In response to detection of a safe mode condition (e.g., detection of a power-down event or detection of a free-fall condition during a drop), latch 70 may be released. Upon release of spring 72 from latch 70, spring 72 will expand outwardly to deployed position 72', where spring 72 may act as a cushion to prevent harsh impacts between assembly 20 and housing 12. Springs such as spring 72 of FIG. 6 may be placed on one or more sides of assembly 20, may be mounted on other components in device 10, and/or may be mounted on portions of housing 12 to prevent internal structural collisions during drop events.

Figure 7:
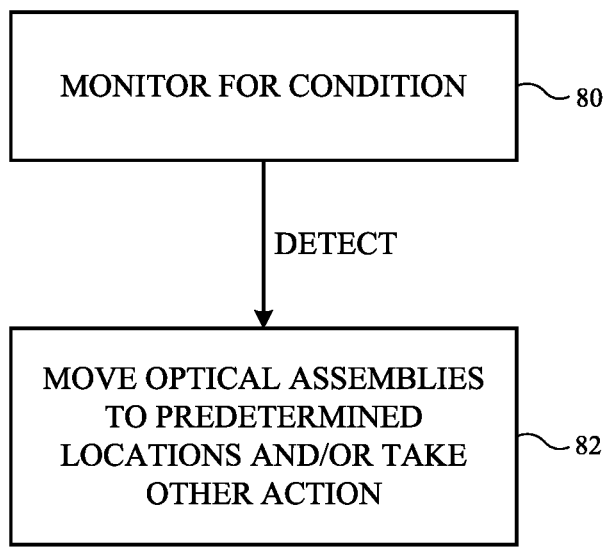
FIG. 7 is a flow chart of illustrative operations involved in using a head-mounted device in accordance with an embodiment.

FIG. 7 is a flow chart of illustrative operations involved in using one or more of the foregoing approaches to protect sensitive portions of device 10 such as optical assemblies 20 from damage during a drop event.

During the operations of block 80, device 10 may monitor for the occurrence of a safe mode condition (e.g., a condition warranting placement of optical assemblies 20 into a predetermined safe position and/or use of one or more safety mechanisms). Device 10 may, as an example, use a sensor (e.g., a touch sensor, button, or other user input sensor) to monitor for a user command that instructs device 10 to power down. Device 10 may also use a position sensor to monitor for a free-fall condition (e.g., a weightless condition that indicates that device 10 is falling and about to strike the ground). In response to detection of the power-down command (e.g., when a user presses a power button), in response to otherwise detecting that device 10 is about to power down, and/or in response to detecting that device 10 has been dropped, appropriate action may be taken at block 82.

During the operations of block 82, as an example, motors 48 may move optical assemblies 20 to predetermined safe positions along rails 22, as described in connection with illustrative positions PX, PN, and PM of FIG. 2. In arrangements in which clutch mechanism 54 is electrically adjustable, clutch 50 may be adjusted appropriately. Brake 60 may also be adjusted and/or impact-cushioning spring 72 may be deployed. When the drop event occurs, one or more of these damage mitigation approaches may be used and may work together to help prevent damage to optical assemblies 20 and/or other sensitive component(s) that are being protected.

To help protect the privacy of users, any personal user information that is gathered by sensors may be handled using best practices. These best practices including meeting or exceeding any privacy regulations that are applicable. Opt-in and opt-out options and/or other options may be provided that allow users to control usage of their personal data.

The foregoing is merely illustrative and various modifications can be made to the described embodiments. The foregoing embodiments may be implemented individually or in any combination.

What is claimed is:

1. A head-mounted device, comprising:
   a head-mounted housing;
   an optical assembly in the head-mounted housing that is configured to provide an image to an eye box;
   a rail coupled to the head-mounted housing along which the optical assembly slides; and
   an actuator configured to position the optical assembly at an impact-safe position along the rail in response to detection of a condition.

2. The head-mounted device defined in claim 1 wherein the rail has an inner end attached to a central portion of the head-mounted housing and has a corresponding floating outer end at a side portion of the head-mounted housing and wherein the impact-safe position is at the outer end.

3. The head-mounted device defined in claim 1 wherein the rail has an inner end at a central portion of the head-mounted housing and has a corresponding outer end at a side portion of the head-mounted housing and wherein the impact-safe position is at the inner end.

4. The head-mounted device defined in claim 1 wherein the rail has an inner end at a central portion of the head-mounted housing and has a corresponding outer end at a side portion of the head-mounted housing and wherein the impact-safe position is at an intermediate location between the outer end and the inner end.

5. The head-mounted device defined in claim 1 further comprising a sensor configured to detect a power-down event, wherein the actuator is configured to move the optical assembly to the impact-safe position in response to the power-down event.

6. The head-mounted device defined in claim 1 further comprising a sensor configured to detect a drop event, wherein the actuator is configured to move the optical assembly to the impact-safe position in response to the detected drop event.

7. The head-mounted device defined in claim 1 further comprising a deployable spring configured to cushion the optical assembly.

8. The head-mounted device defined in claim 7 further comprising a sensor configured to detect a power-down event, wherein the deployable spring is configured to deploy in response to the power-down event.

9. The head-mounted device defined in claim 7 further comprising a sensor configured to detect a drop event, wherein the deployable spring is configured to deploy in response to the detected drop event.

10. The head-mounted device defined in claim 1 further comprising an adjustable brake configured to adjust resistance of the optical assembly to sliding along the rail.

11. The head-mounted device defined in claim 10 further comprising a sensor configured to detect a power-down event, wherein the brake is configured to engage in response to the power-down event.

12. The head-mounted device defined in claim 10 further comprising a sensor configured to detect a drop event, wherein the brake is configured to engage in response to the detected drop event.

13. The head-mounted device defined in claim 1 further comprising:
 a nut coupled to the optical assembly;
 a screw received by the nut; and
 a clutch coupled between the actuator and the screw, wherein the actuator is configured to use the clutch to rotate the screw to slide the optical assembly along the rail.

14. The head-mounted device defined in claim 13 wherein the clutch comprises a magnet.

15. The head-mounted device defined in claim 13 wherein the clutch comprises a viscous fluid.

16. The head-mounted device defined in claim 13 wherein the clutch comprises an electrically adjustable actuator.

17. A head-mounted device, comprising:
 a head-mounted housing;
 an optical assembly in the head-mounted housing that is configured to provide an image to an eye box;
 a rail along which the optical assembly slides;
 an electrically adjustable latch configured to be released in response to sensor detection of a drop event; and
 a deployable spring configured to deploy when the latch is released to provide cushioning between the optical assembly and the head-mounted housing during the drop event.

18. The head-mounted device defined in claim 17 further comprising a sensor configured to detect a power-down event, wherein the deployable spring is configured to deploy in response to the power-down event.

19. The head-mounted device defined in claim 17 further comprising a sensor configured to detect the drop event.

20. A head-mounted device, comprising
 a head-mounted housing;
 an optical assembly in the head-mounted housing that is configured to provide an image to an eye box;
 a rail along which the optical assembly slides; and
 an electrically adjustable brake configured to adjust resistance to sliding of the optical assembly along the rail, wherein the electrically adjustable brake is configured to hold the optical assembly at a given location on the rail in response to a drop event.

* * * * *